United States Patent
Bosma et al.

(10) Patent No.: US 9,428,092 B2
(45) Date of Patent: Aug. 30, 2016

(54) SLIDING AND REMOVABLE CUP HOLDER ASSEMBLY FOR VEHICLE

(71) Applicant: Honda Motor Co., Ltd., Tokyo (JP)

(72) Inventors: Cordell L. Bosma, Powell, OH (US); David M. Salmonowicz, Zanesfield, OH (US); Neal W. Luginbill, Marysville, OH (US); Michael J. Narazaki, Worthington, OH (US); Robert A. Skapof, Dublin, OH (US); David W. Carter, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/299,043

(22) Filed: Jun. 9, 2014

(65) Prior Publication Data
US 2015/0352993 A1 Dec. 10, 2015

(51) Int. Cl.
*B60N 3/10* (2006.01)
*B60R 7/04* (2006.01)
*B60N 2/46* (2006.01)
*B60R 11/00* (2006.01)

(52) U.S. Cl.
CPC ............ *B60N 3/103* (2013.01); *B60N 3/101* (2013.01); *B60N 3/102* (2013.01); *B60R 7/04* (2013.01); *B60R 2011/0007* (2013.01)

(58) Field of Classification Search
CPC ...... B60N 3/103; B60N 3/102; B60N 3/107; B60R 7/02
See application file for complete search history.

(56) References Cited

U.S. PATENT DOCUMENTS

| | | | |
|---|---|---|---|
| 5,316,368 A | 5/1994 | Arbisi | |
| 5,718,405 A | 2/1998 | Adachi | |
| 6,065,729 A | 5/2000 | Anderson | |
| 6,196,434 B1 * | 3/2001 | Angran | B60N 3/103 224/549 |
| 6,435,587 B1 | 8/2002 | Flowerday et al. | |
| 6,572,169 B2 | 6/2003 | Panhelleux et al. | |
| 6,616,206 B2 | 9/2003 | Luginbill et al. | |
| 6,644,526 B2 | 11/2003 | Pegorier | |
| 6,854,779 B2 * | 2/2005 | Gehring | B60N 3/102 224/483 |
| 6,932,402 B2 | 8/2005 | Niwa et al. | |
| 7,011,273 B1 | 3/2006 | Stanford | |
| 7,093,874 B2 | 8/2006 | Brettfeld et al. | |

(Continued)

FOREIGN PATENT DOCUMENTS

DE 19854245 5/2000
EP 1048514 11/2000

(Continued)

OTHER PUBLICATIONS

Website: http://www.carid.com/dorman/cup-holder.html, "Dorman®—Cup Holder", printed Aug. 26, 2014.

(Continued)

*Primary Examiner* — Jeanette E Chapman
(74) *Attorney, Agent, or Firm* — Rankin, Hill & Clark LLP (57) ABSTRACT

A shelfless sliding and removable cup holder assembly for a vehicle includes a console structure disposed within the vehicle. The console structure includes first and second lateral side walls defining a storage bin therebetween. The first lateral side wall defines a recessed track. The cup holder assembly further includes cup holder member slidably and removably mounted within the console structure. The cup holder member has a guide removably received in the recess track and slidably movable along the recessed track.

20 Claims, 4 Drawing Sheets

(56) References Cited

U.S. PATENT DOCUMENTS

| | | | |
|---|---|---|---|
| 7,168,669 B2* | 1/2007 | Park | B60N 3/106 224/539 |
| 7,258,381 B2* | 8/2007 | Sturt et al. | 296/24.34 |
| 7,322,500 B2 | 1/2008 | Maierholzner | |
| 7,341,297 B2 | 3/2008 | Nakamura et al. | |
| 7,344,056 B2 | 3/2008 | Shelmon et al. | |
| 7,407,210 B2 | 8/2008 | Arbaugh et al. | |
| 7,413,229 B2 | 8/2008 | Kukucka et al. | |
| 7,416,235 B2 | 8/2008 | Rajappa et al. | |
| 7,434,859 B2 | 10/2008 | Mulvihill | |
| 7,530,615 B2 | 5/2009 | Ogura | |
| 7,543,874 B2 | 6/2009 | Ogura et al. | |
| 7,566,040 B2 | 7/2009 | Lota | |
| 7,581,774 B2 | 9/2009 | Abro et al. | |
| 7,731,254 B2 | 6/2010 | Lota | |
| 7,766,408 B2 | 8/2010 | Lota et al. | |
| 7,770,953 B2* | 8/2010 | Koarai | 296/24.34 |
| 7,784,843 B2 | 8/2010 | Lota et al. | |
| 7,810,969 B2* | 10/2010 | Blackmore | B60N 2/4686 362/459 |
| 8,056,754 B2 | 11/2011 | Stoner | |
| 8,246,097 B2 | 8/2012 | Beyer | |
| 8,276,964 B2 | 10/2012 | Werner et al. | |
| 8,480,151 B2 | 7/2013 | Gaudig et al. | |
| 8,714,613 B1* | 5/2014 | Gillis | B60R 7/04 296/24.34 |
| 8,870,255 B2 | 10/2014 | Mildner et al. | |
| 8,888,147 B2 | 11/2014 | Blanck et al. | |
| 8,919,625 B1* | 12/2014 | Pope | B62J 11/00 224/412 |
| 2002/0089203 A1 | 7/2002 | Flowerday et al. | |
| 2003/0015883 A1* | 1/2003 | Boys | B60R 9/00 296/37.1 |
| 2003/0127877 A1* | 7/2003 | Luginbill | B60N 2/4646 296/37.8 |
| 2006/0060741 A1 | 3/2006 | Yanagita et al. | |
| 2007/0075558 A1 | 4/2007 | Kim et al. | |

FOREIGN PATENT DOCUMENTS

| | | |
|---|---|---|
| JP | 550875 | 3/1993 |
| JP | 2507114 | 5/1996 |
| JP | 2002316572 | 10/2002 |

OTHER PUBLICATIONS

Website: http://www.amazon.com/gp/product/B0046D1J1Y/ref=as_li_ss_tl?ie=UTF8&tag=everybenz20&linkCode=as2&camp=1789&creative=390957&creativeASIN=B0046DIJ1Y, "BMW Genuine E36 Cup Holder in Center Console", printed Aug. 26, 2014.

Office Action of U.S. Appl. No. 14/526,606 dated Aug. 31, 2015, 20 pages.

Advisory Action of U.S. Appl. No. 14/299,043 dated Apr. 28, 2016, 6 pages.

Office Action of U.S. Appl. No. 14/526,606 dated Jan. 25, 2016, 19 pages.

* cited by examiner

SLIDING AND REMOVABLE CUP HOLDER ASSEMBLY FOR VEHICLE

BACKGROUND

For a long time, vehicles have been provisioned with various types of cup holders to facilitate the driver and/or passenger carrying cups or other beverage containers in the vehicle. Generally, known vehicle cup holders come in two variations. One variation is a stationary/fixed cup holder that forces the driver or passengers to use the cup holder in a single position and makes any empty volume disposed under the cup holder unusable for storage. Another variation is a sliding cup holder that is moveable between a plurality of positions. Such sliding cup holders are generally not removable.

SUMMARY

According to one aspect, a shelfless sliding and removable cup holder assembly for a vehicle includes a console structure disposed within the vehicle. The console structure includes first and second lateral side walls defining a storage bin therebetween. The first lateral side wall defines a recessed track. The cup holder assembly further includes cup holder member slidably and removably mounted within the console structure. The cup holder member has a guide removably received in the recess track and slidably movable along the recessed track.

According to another aspect, a cup holder assembly of a vehicle includes a console structure defining a storage compartment therein and a cup holder member slidably disposed within the storage compartment of the console structure for sliding movement between a forward sliding position and a rearward sliding position. The cup holder member is readily removable from the console structure to permit the storage compartment to be used without the cup holder member. The storage compartment is defined by laterally spaced apart walls. The laterally spaced apart walls define recessed tracks therein for slidably mounting the cup holder member.

According to a further aspect, a console assembly for a vehicle includes a console structure defining a storage compartment and a cup holder member slidably and removably mounted to the console structure within the storage compartment. The cup holder member is slideable between a forward position disposed adjacent a front wall of the console structure and a rearward position disposed adjacent a rearward wall of the console structure. The console assembly further includes recessed tracks defined in lateral walls of the console structure and guide portions of the cup holder member removably received in the recessed tracks for guiding sliding movement of the cup holder member between the forward position and the rearward position.

DETAILED DESCRIPTION

Figure 1:
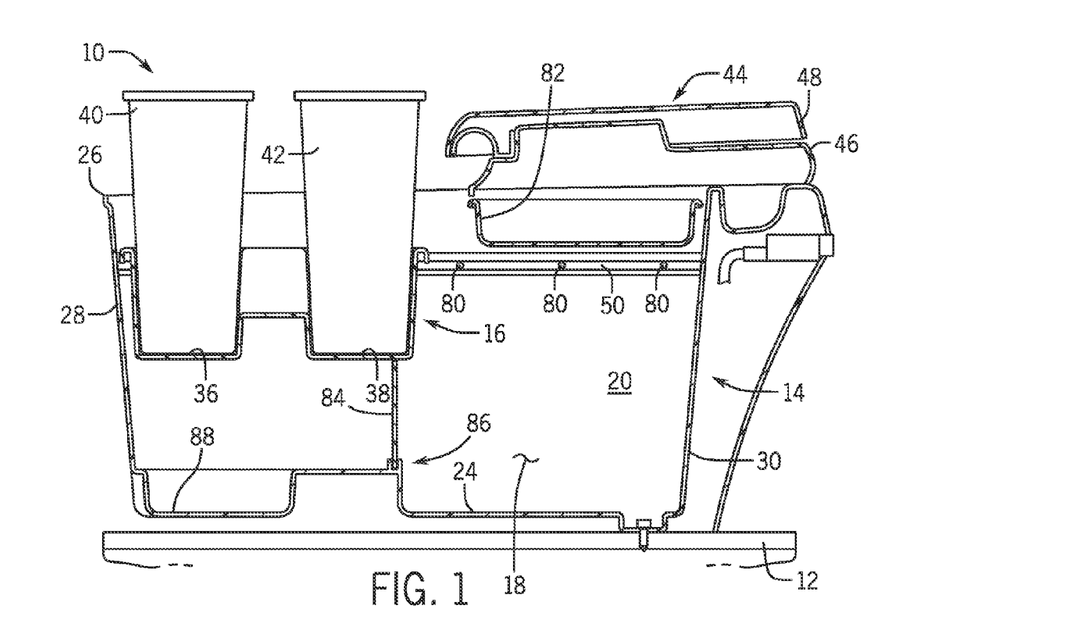
FIG. 1 is a schematic cross-sectional view of a shelfless sliding and removable cup holder assembly for a vehicle according to an exemplary embodiment.
Figure 2:
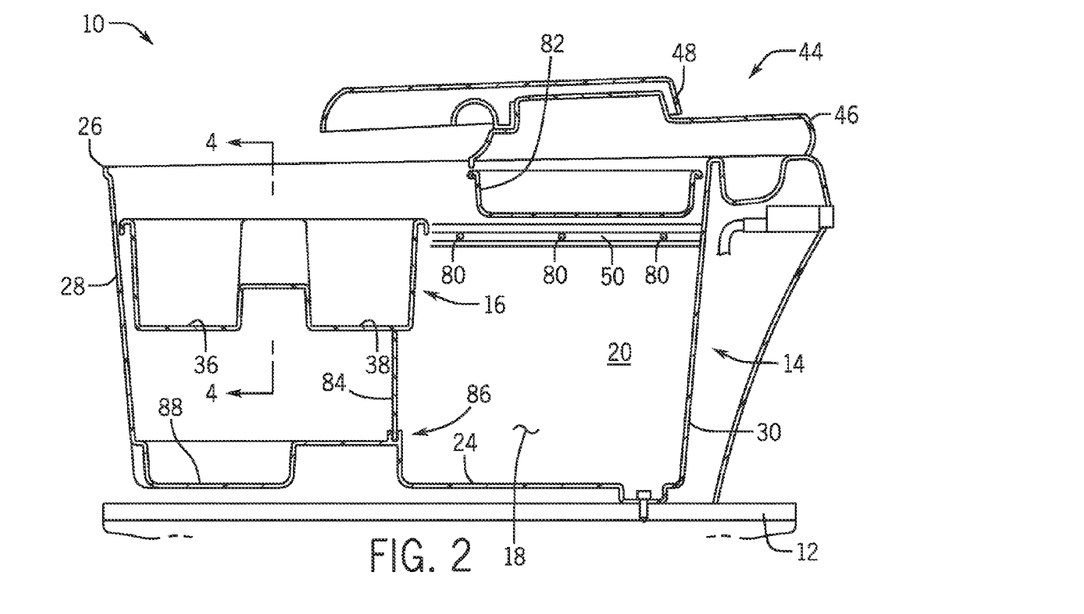
FIG. 2 is a schematic cross-sectional view similar to FIG. 1 but shown with cups or beverage containers removed from the cup holder assembly and shown with a sliding arm rest portion in an extended position.
Figure 3:
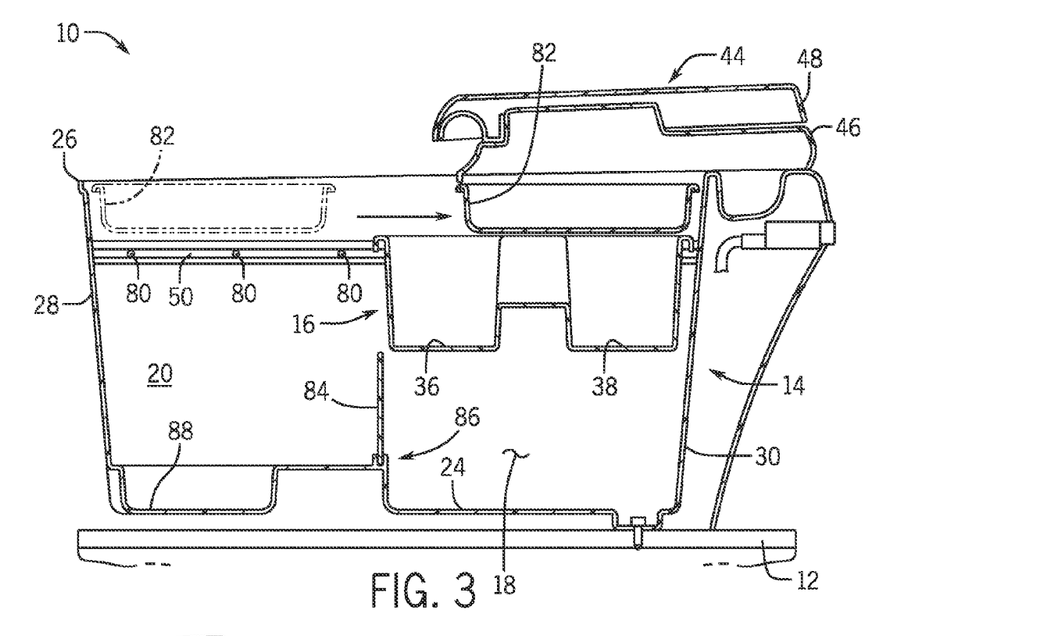
FIG. 3 is a schematic cross-sectional view similar to FIGS. 1 and 2 but shown with a cup holder member slidably moved to a rearward position within a surrounding console structure and shown with the arm rest member in a retracted position.

Referring now to the drawings wherein the showings are for purposes of illustrating one or more exemplary embodiments and not for purposes of limiting the same, FIGS. 1-3 illustrates a sliding and removable cup holder assembly 10 for a vehicle 12 according to an exemplary embodiment. As shown, the cup holder assembly 10 includes a console structure 14 disposed within the vehicle 12 and a cup holder member 16 slidably and removably mounted within the console structure 14. More particularly, the console structure 14 defines a storage compartment or bin 18 therein and the cup holder member 16 is slidably disposed within the storage compartment 18 of the console structure 14 for sliding movement between a forward sliding position (the position shown in FIGS. 1 and 2) and a rearward sliding position (the position shown in FIG. 3). In addition to being slidable within the console structure 14, and as will be described in further detail below, the cup holder member 16 is readily removable from the console structure 14 to permit the storage compartment 18 to be used without the cup holder member 16. Thus, the cup holder 16 is slidably and removably mounted to the console structure 14 within the storage compartment 18.

Figure 4:
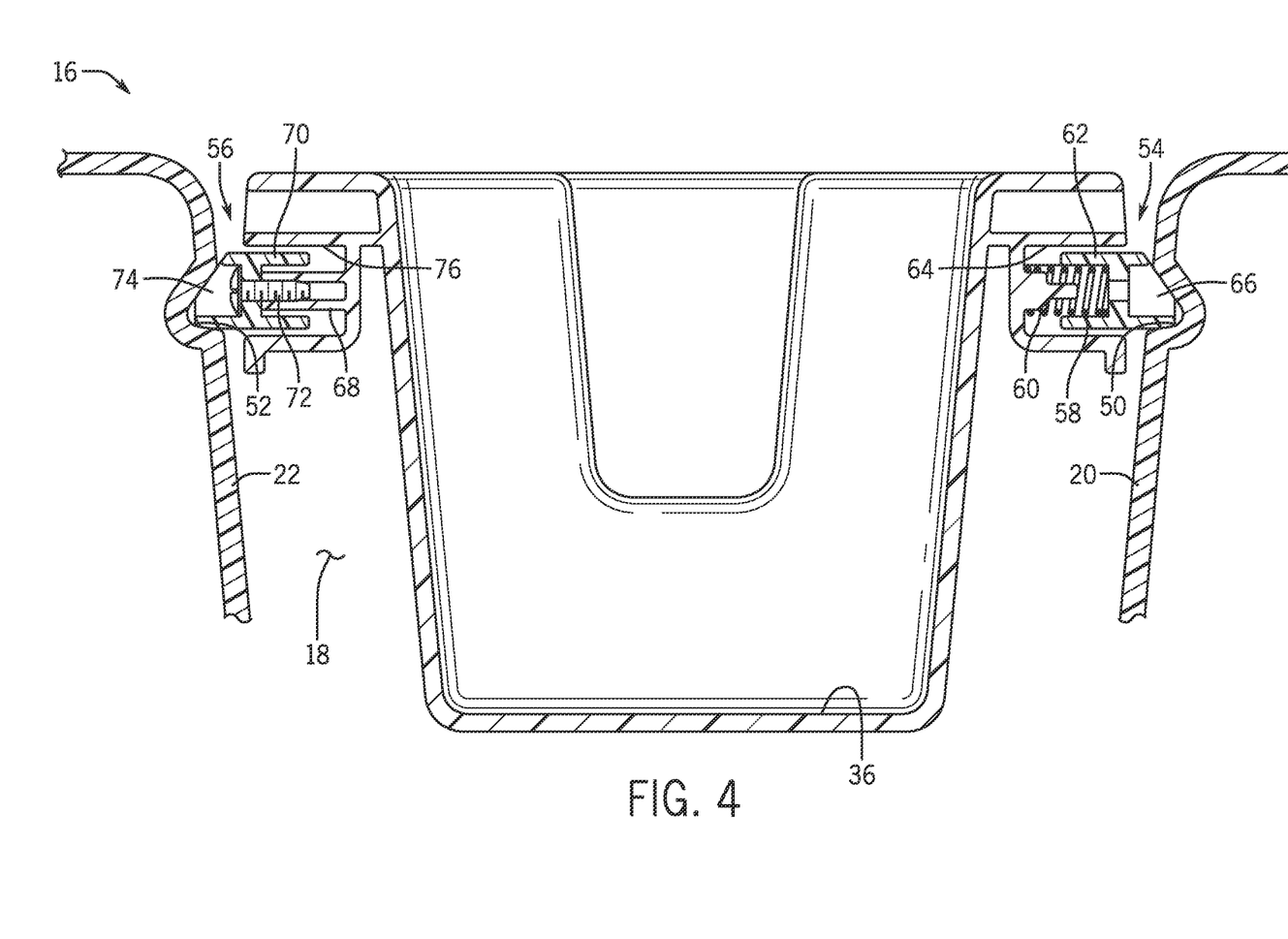
FIG. 4 is a cross-sectional view taken along the line 4-4 of FIG. 2.

With additional reference to FIG. 4, the storage compartment 18 is defined by laterally spaced apart walls 20, 22, including first lateral sidewall 20 and second lateral sidewall 22. The storage compartment 18 is also defined by a lower wall or floor 24. As shown with respect to the wall 20 in FIGS. 1-3, both the laterally spaced apart walls 20, 22 extend from a floor 24 of the storage compartment 18 to an upper extent of the storage compartment 18. In the illustrated embodiment, the upper extent is an open end or open upper side 26 of the console structure 14. The storage compartment 18 is further defined by longitudinally spaced apart walls 28, 30, including front wall 28 and rearward wall 30 Accordingly, the storage compartment 18 defined between the walls 20, 22, 28 and 30 has a generally rectangular configuration, though this is not required. The cup holder member 16 is specifically mounted at a vertical location spaced apart from the floor 24 of the storage compartment 18. In operation, the cup holder member 16 is slidable between the forward position shown in FIGS. 1 and 2 wherein the cup holder member 16 is disposed adjacent the front wall 28 of the console structure 14 and a rearward position shown in FIG. 3 wherein the cup holder member 16 is disposed adjacent the rearward wall 30 of the console structure 14.

The cup holder member 16 of the illustrated embodiment includes at least two cup recesses 36, 38 for accommodating associated cups or beverage containers 40, 42 therein. As shown, the at least two cup recesses 36, 38 can be spaced apart longitudinally in a direction parallel to a sliding direction for the cup holder member 16. The console structure 14 can additionally include a closure member 44 disposed over at least a portion of the open upper side 26 of the console structure 14. In the illustrated embodiment, the closure member 44 includes a base portion 46 that extends over at least a portion of the storage compartment 18 from the rearward wall 30 along the open end 26 of the console structure 14 and a slidable portion 48 that is slidable to an extended position (shown in FIG. 2) relative to the base portion 46. Optionally, the base portion 46 can be pivotally secured to the console structure 14 to enable pivotal opening of the closure member 44 relative to the console structure 14. The console structure 14 and the closure member 44 can be together referred to as a console assembly.

The cup holder member 16 is slidably mounted to the first and second lateral sidewalls 20, 22 for sliding movement along the lateral sidewalls 20, 22. The console structure 14 defines at least one recessed track (e.g., recessed tracks 50, 52) along which the cup holder member 16 is slidably movable. In the illustrated embodiment, recessed track 50 is defined in the first lateral sidewall 20 and the cup holder member 16 includes a guide or guide portion 54 removably received in the recessed track 50 and slidably movable along the recessed track 50. In the illustrated embodiment, the recessed track 50 is a first recessed track and the guide 54 is a first guide received in the first recessed track 50. Recessed track 52 is a second recessed track defined in the second lateral sidewall 22 and the cup holder member 16 can include a second guide or guide portion 56 removably received in the second recessed track 52 and slidably movable along the second recessed track 52. Together, in the illustrated embodiment, the laterally spaced apart walls 20, 22 define the recessed tracks 50, 52 therein for slidably mounting the cup holder member 16.

By this arrangement, the recessed tracks 50, 52 are defined in the lateral walls 20, 22 of the console structure 14 and the guides or guide portions of the cup holder member 16 are removably received in the recessed tracks 50, 52 for guiding sliding movement of the cup holder member 16 between the forward position (shown in FIGS. 1 and 2) and the rearward position (shown in FIG. 3). Advantageously, this provides a shelfless arrangement and the sliding and removable cup holder assembly 10 can be referred to as a shelfless sliding and removable cup holder assembly. More particularly, no shelf or shelf-like member protrudes into the storage compartment from the lateral sidewalls 20, 22 (or the walls 28, 30) for supporting the cup holder member 16 avoiding the disadvantage of some prior art designs wherein shelf member project into the storage compartment reducing the amount of usable storage space.

The cup holder member 16 can include at least one spring-biased guide received in one of the recessed tracks 50 or 52. In the illustrated embodiment, the guide 54 is a spring-biased guide that is shown received in and therefore slideable along the recessed track 50. This enables the cup holder member to be removed from the console structure 14 as will be described in further detail below. Thus, the first guide 54 is a spring-biased guide that is urged laterally outwardly into the first recess track 50 as best shown in FIG. 4. In the illustrated embodiment, the second guide 56 is a fixed guide received in the other of the recessed tracks 50 or 52. As shown, the second guide 56 is shown received in and therefore slideable along the recessed track 52.

By this arrangement, the cup holder member 16 can be reversible; thus, the spring-biased guide 54 could be instead received in the recessed track 52 and the fixed guide 56 could be instead received in the recessed track 50 as desired by a driver or passenger of the vehicle 12. Such reversibility may be desirable, for example, in instances where the cup holder recesses 36, 38 vary in size (e.g., recess 36 is a large recess and recess 38 is a small recess) to allow selective forward and rearward positioning of the recesses 36, 38 relative to one another. Also, it is to be appreciated by those skilled in the art that the guides could be reversed on the cup holder member 16 in an alternate design so that the guide 56 is a spring-biased guide and the guide 54 is a fixed guide. As another variation, both guides 54, 56 could be spring-biased guides like the guide 54 in the illustrated embodiment.

Returning to the illustrated embodiment, the guide 54 (i.e., the spring-biased guide) can include a spring 58 that urges the guide 54 laterally outwardly into the recessed track 50. As shown in the illustrated embodiment, the spring 58 can be a coil spring received on a protruding portion 60 of the cup holder member 16 with a movable portion 62 arranged in a recess 64 of the cup holder member 16 annularly about the spring 58 so that the spring 58 urges the movable portion 62 laterally outwardly away from the protruding portion 60. The movable portion 62 can include a tapered engaging section 66 that is selectively and/or removably received within the corresponding recessed track 50. The tapered engaging section 66 has a particular shape that facilitates easy receipt of the guide 54 into the recessed track 50 when the cup holder member 16 is installed or re-installed into the console structure 14.

In contrast, no spring is associated with the fixed guide 56. In the illustrated embodiment, the fixed guide 56 includes a protruding portion 68 with a guide portion 70 fixed thereto by a suitable fastener 72, such as a screw or bolt. The guide portion 70 can include the tapered engaging section 74 like the tapered engaging section 66 on the guide 54 that is received within the recessed track 52 to facilitate easy installation or reinstallation of the cup holder member 16. Advantageously, the movable guide portion 62 and the fixed guide portion 70 can be the same or similar in construction so that these parts could be used interchangeably during assembly of the cup holder assembly 10, though this is not required. The distinguishing features between the guides 54, 56 include the spring 58 for provisioning the guide portion 62 as a movable guide portion and the fastener 72 for provisioning the guide portion 70 as a fixed guide portion. Also like the guide 54, the guide 56 can include the protruding portion 68 being disposed within a recess 76.

To remove the cup holder member 16 from the console structure 14, the cup holder member 16 is manually moved laterally toward the first lateral sidewall 20 of the console structure 14 against the urging of the spring 58 to compress the spring 58 and allow the fixed guide 56 to be removed from the recessed track 52. Once the fixed guide 56 is removed, the spring-biased guide 54 can be removed from the recessed track 50 and then the cup holder member 16 removed from the console structure 14. To re-install the cup holder member 16, and with particular reference to FIG. 5, the fixed guide 56 is first inserted and installed in the recessed track 52 and then the spring-biased guide 54 is inserted and installed in the recessed track 50 with the spring 58 again being compressed to enable the movable guide portion 62 to move down along the console structure 14, and particularly down along the lateral sidewall 20, and into the recessed track 50.

Figures 5, 6:
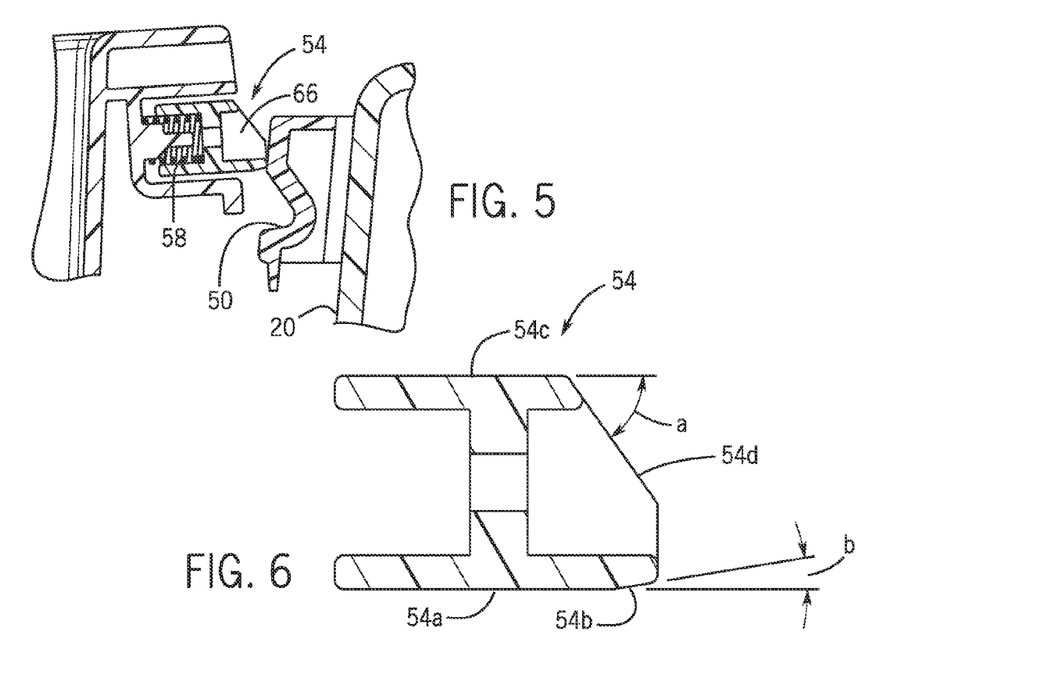
FIG. 5 is a partial cross-sectional view of a spring-biased guide of the cup holder member similar to FIG. 4 but shown with the cup holder being installed in the console structure.
FIG. 6 is a partial enlarged view of the spring-biased guide of FIGS. 4 and 5.

With additional reference to FIG. 6, one or both of the guides 54, 56 (only guide 54 shown in FIG. 6) can have a shape that allows for increased friction between the cup holder member 16 and corresponding ones of the lateral sidewalls 20, 22. The shape can be particularly selected so as to significantly increase friction between the cup holder member 16 and the sidewalls 20, 22 as the cup holder member 16 carries more weight (e.g., when beverage containers 40, 42 are carried in the recesses 36, 38). In one embodiment, a lower side 54a of the guide 54 can have a chamfer 54b with an angle "b" that is less than 10 degrees relative to a horizontal axis to facilitate such increased friction as the cup holder member 16 is loaded. In particular, the angle b can be less than 5 degrees and, for example, is shown being 3 degrees relative to a horizontal axis in the illustrated embodiment. An upper side 54c of the guide 54 can have a chamfer 54d with an angle "a" that is between about 50 to 70 degrees and, for example, is 55 degrees in the illustrated embodiment.

Optionally, the cup holder assembly 10 can include a sliding tray 82 mounted within the console structure 14 at a vertical location above the cup holder member 16. The sliding tray 82 can be independently slidably movable relative to the cup holder member 16. Accordingly, either or both the sliding tray 82 and the cup holder member 16 can close the storage compartment 18 together with the closure member 44 (e.g., when the sliding portion 48 is in the extended position) when in a respective forward position. The cup holder assembly 10 can also optionally include a partition wall 84 extending upward from the lower wall 24 and positioned in spaced apart relation from each of the front wall 28 and the rearward wall 30. Though not shown, the partition wall 84 can extend laterally from the first lateral sidewall 20 to the second lateral sidewall 22. In the illustrated embodiment, the partition wall 84 is removable from the console structure 14 and is removably received within a grooved structure 86 defined along the lower wall 24. As shown the partition wall 84 can extend upward to a location wherein the partition wall mates with or is closely adjacent an underside of the cup holder member 16 when the cup holder member 16 is in the forward position.

Forward of the partition member 84, in the illustrated embodiment, the lower wall 24 defines a cup holder recess 88. More particularly, the cup holder recess 88 can be defined by a raised portion 24a of the lower wall 24 on which the grooved structure 88 can be disposed. The cup holder recess 88 can be sized for accommodating larger beverage containers (e.g., a water bottle or large beverage cup too large to fit in the cup holder recesses 36, 38, not shown), though this is not required.

The console structure 14 can be constructed in one of various construction methods. For example, the console structure 14 could be constructed as a one-piece mold wherein the recessed tracks 50, 52 are integrally formed with the lateral sidewalls 20, 22. Alternatively, the recessed tracks 50, 52 could be formed in separate components and these separate components could be attached to the console structure (e.g., within apertures defined in the sidewalls 20, 22 of the console structure or as separate wall portions that attach to the console structure 14). As another example, the console structure could be molded as two halves (or as more than two components) and the halves joined together during assembly. Generally, any suitable construction method could be used to form the console structure 14.

An additional feature of the cup holder assembly 10 of the illustrated embodiment is the provision of a plurality of detents 80 disposed along at least one of the first and second recessed tracks 50, 52 for locking in a longitudinal position of the cup holder member 16 relative to the console structure 14. In the illustrated embodiment, only the recessed track 50 is shown having the longitudinally spaced apart detents defining positions for the cup holder member 16, but it is to be appreciated that matching detents could be provided along the recessed track 52, if desired. In any case, receipt of the guides 54 and/or 56 within the detents 80 inhibits sliding movement of the cup holder member 16 relative to the console structure 14. In particular, this inhibition of movement can be sufficient to prevent or reduce the likelihood of the cup holder member 16 slidably moving relative to the console structure 13 inadvertently, such as during acceleration of the vehicle 12, but still enables manual movement of the cup holder member 16 relative to the console structure 14 when a sufficient manual force is applied thereto. The detents 80 are optional and the cup holder assembly 10 could exclude them.

Figure 7:
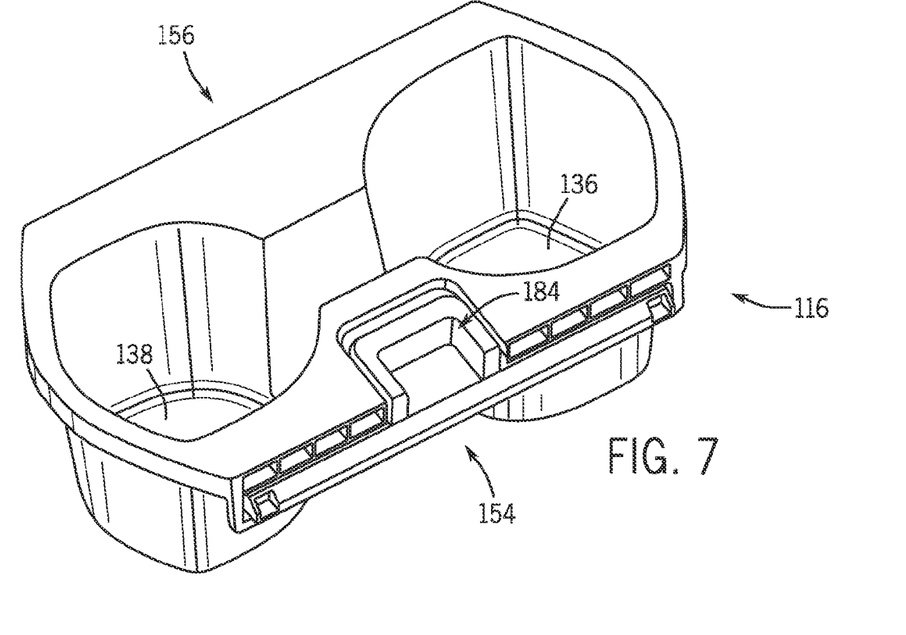
FIG. 7 is a perspective view of a cup holder member according to an alternate exemplary embodiment.
Figure 8:
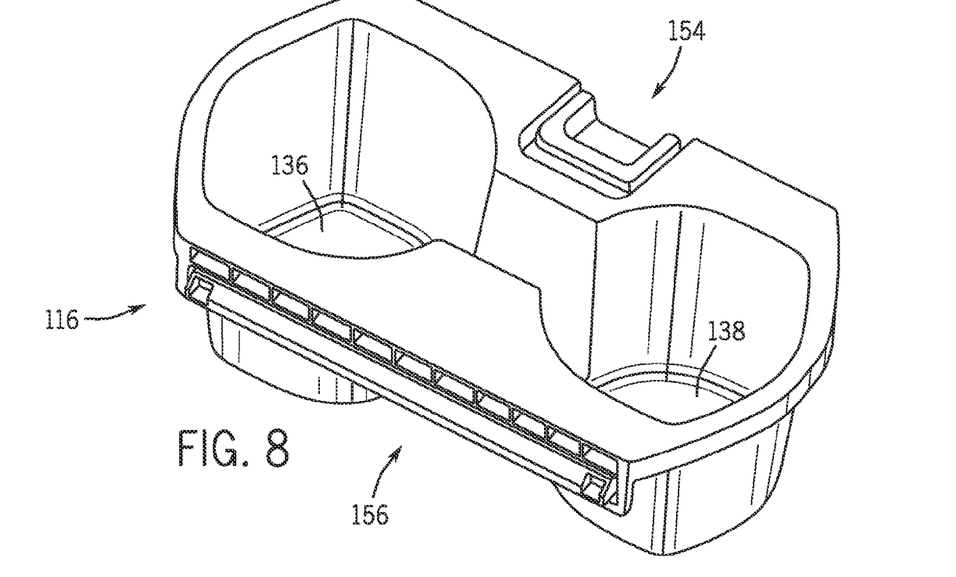
FIG. 8 is another perspective view of the cup holder member of FIG. 7.

With reference to FIGS. 7 and 8, a cup holder member 116 is shown according to an alternate embodiment. In most respects, the cup holder member 116 can be the same and/or function the same as the cup holder member 16. In particular, the cup holder member 116 can have a spring-loaded guide 154 and a fixed guide 156 disposed on lateral sides of cup holder recesses 136, 138. The guides 154, 156 can each extend along a substantial longitudinal extent of the cup holder member 116. Additionally, the spring-loaded guide 154 can include a finger grasping actuator 184 to facilitate easy manual movement of the guide 154 against the urging of its spring (not shown). The cup holder member 116 can be substituted for the cup holder member 16 of the cup holder assembly 10.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A shelfless sliding and removable cup holder assembly for a vehicle, comprising:
a console structure disposed within the vehicle, the console structure includes first and second lateral side walls defining a storage bin therebetween, the first lateral side wall defines a recessed track; and
a shelfless cup holder member slidably and removably mounted within the console structure, the cup holder member defining at least one upward facing circular cup recess for receiving an associated cup, the cup holder member having a guide removably received in the recessed track and slidably movable along the recessed track to slidably move the cup holder member longitudinally relative to the console structure, wherein a lower side of the guide supports the cup holder member relative to the console structure, the lower side of the guide resting on an upward facing surface of the recessed track, the cup holder member completely removable and detachable from the console structure via the guide being removable from the recessed track by lateral movement away from the recessed track followed by upward pivotal movement relative to the recessed track with the guide moving upward relative to the recessed track.

2. The assembly of claim 1 wherein the recessed track is a first recessed track and the guide is a first guide received in the first recessed track, and wherein a second recessed track is defined in the second lateral side wall and the cup holder includes a second guide removably received in the second recessed track and slidably movable along the second recessed track.

3. The assembly of claim 2 wherein the first guide is a spring-biased guide that is urged laterally outwardly into the first recessed track.

4. The assembly of claim 3 wherein the second guide is a fixed guide.

5. The assembly of claim 3 wherein a plurality of detents are disposed along at least one of the first and second recessed tracks for locking a longitudinal position of the cup holder member relative to the console structure.

6. The assembly of claim 1 wherein the guide includes a spring urging the guide laterally outwardly into the recessed track, the cup holder member removable from the console structure by compressing the guide against the spring.

7. The assembly of claim 1 wherein the at least one upward facing circular cup recess includes two cup recesses for accommodating associated cups therein, the two cup recesses spaced apart longitudinally in a direction parallel to a sliding direction for the cup holder member.

8. The assembly of claim 1 further including:
a closure member disposed over at least a portion of an open upper side of the console structure.

9. The assembly of claim 1 wherein the console structure defines a storage compartment therein and the cup holder member is slidably mounted within the storage compartment at a vertical location spaced apart from a lower wall of the storage compartment.

10. The assembly of claim 1 wherein the console structure defines a recessed track along which the cup holder member is slidably movable and wherein a plurality of detents are disposed along the recessed track for locking a longitudinal position of the cup holder member relative to the console structure.

11. The assembly of claim 1 wherein the lower side of the guide has a chamfer of less than 10 degrees relative to a horizontal axis to provide increased friction between the cup holder member and the console structure when the cup holder member is loaded.

12. The assembly of claim 11 wherein an upper side of the guide has a chamfer of about 50-70 degrees relative to a horizontal axis.

13. The assembly of claim 1 further including:
a sliding tray slidably mounted within the console structure at a vertical location above the cup holder member, the sliding tray independently slidably movable relative to the cup holder member and slidably movable to a position disposed directly above the cup holder member.

14. A cup holder assembly of a vehicle, comprising:
a console structure defining a storage compartment therein; and
a cup holder member slidably disposed within the storage compartment of the console structure for sliding movement between a forward sliding position and a rearward sliding position, the cup holder member defining a circular cup holder recess and being readily removable from the console structure to permit the storage compartment to be used without the cup holder member, wherein the storage compartment is defined by laterally spaced apart walls, the laterally spaced apart walls defining recessed tracks therein for slidably mounting the cup holder member, wherein the laterally spaced apart walls extend from a floor of the storage compartment to an upper extent of the storage compartment, and wherein a lateral dimension across the top of the cup holder member is less than a lateral dimension between the laterally spaced apart walls at the upper extent, and wherein the cup holder member is laterally movable relative to the console structure to fully disengage the cup holder member from at least one of the recessed tracks for pivoting the cup holder member and vertically removing the cup holder member from the console structure, and further the cup holder member includes one spring biased guide received in one of the recessed tracks and one fixed guide received in the other of the recessed tracks.

15. The assembly of claim 14 wherein the guides are removably received in the recessed tracks to guide sliding movement of the cup holder member relative to the console structure, the recessed tracks includes longitudinally spaced apart detents defining positions for the cup holder member, receipt of the guides within the detents inhibiting sliding movement of the cup holder member relative to the console structure.

16. A console assembly for a vehicle, comprising:
a console structure defining a storage compartment;
a cup holder member slidably and removably mounted to the console structure within the storage compartment, the cup holder member slideable between a forward position disposed adjacent a front wall of the console structure and a rearward position disposed adjacent a rearward wall of the console structure;
recessed tracks defined in lateral walls of the console structure;
detents defined at spaced apart locations along the recessed tracks for defining locking positions for the cup holder member; and
guide portions of the cup holder member removably received in the recessed tracks for guiding sliding movement of the cup holder member between the forward position and the rearward position, the guide portions removably receivable in the detents to lock the position of the cup holder member relative to the console structure, and the guide portions laterally retractable from the recessed tracks to fully remove the guide portions from the recessed tracks.

17. The assembly of claim 16 further including:
a sliding tray slidably mounted to the console structure above cup holder member, the sliding tray slideable between a sliding tray forward position disposed adjacent the front wall of the console structure and a sliding tray rearward position disposed adjacent the rearward wall of the console structure, the sliding tray further slidably movable to a position directly above the cup holder member.

18. The assembly of claim 17 wherein the guide portions include a first guide that is biased into a corresponding one of the recessed tracks and a second guide that is a non-biased fixed guide.

19. The assembly of claim 18 wherein the lower side of the guide has a chamfer of less than 10 degrees relative to a horizontal axis to provide increased friction between the cup holder member and the console structure when the cup holder member is loaded and wherein an upper side of the guide has a chamfer of about 50-70 degrees relative to a horizontal axis.

20. The assembly of claim 19 wherein the cup holder member is completely removable and detachable from the console structure via the guide being removable from the recessed track by lateral movement away from the recessed track followed by upward pivotal movement relative to the recessed track with the guide moving upward relative to the recessed track.

\* \* \* \* \*